No. 887,227. PATENTED MAY 12, 1908.
P. N. RAMSEY.
DUST REMOVING AND EXHAUST DEVICE FOR AUTOMOBILES.
APPLICATION FILED MAR. 14, 1902.
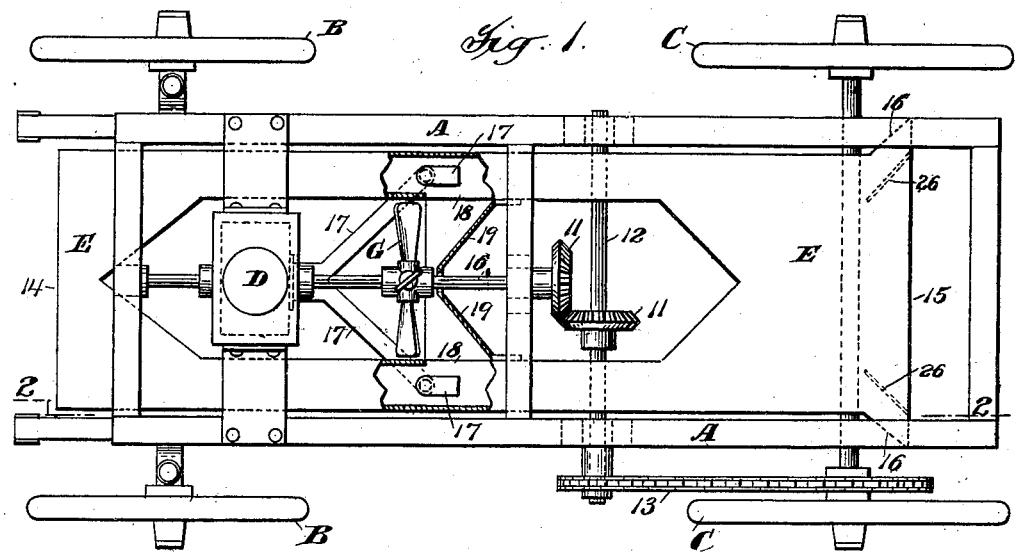
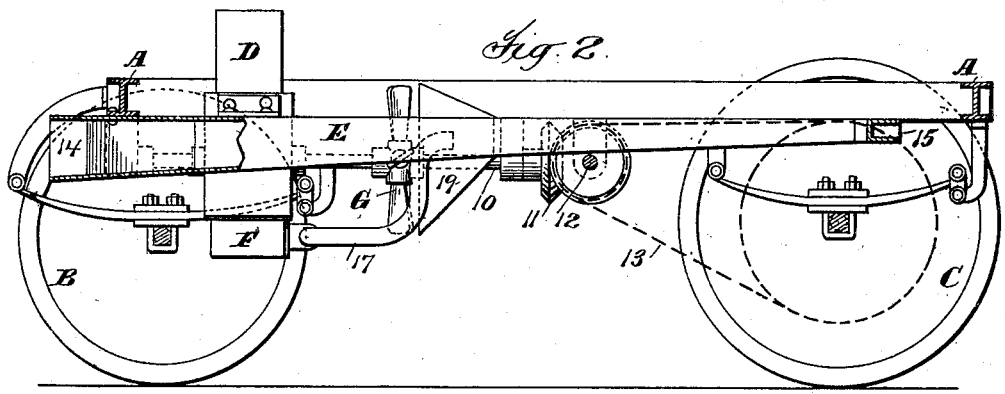

UNITED STATES PATENT OFFICE.

PETER N. RAMSEY, OF NEW YORK, N. Y.

DUST-REMOVING AND EXHAUST DEVICE FOR AUTOMOBILES.

No. 887,227.  Specification of Letters Patent.  Patented May 12, 1908.

Application filed March 14, 1902. Serial No. 98,145.

*To all whom it may concern:*

Be it known that I, PETER N. RAMSEY, a citizen of the United States, residing at New York city, county of New York, and State of New York, have invented certain new and useful Improvements in Dust-Removing and Exhaust Devices for Automobiles, fully described and represented in the following specification and the accompanying drawings, forming a part of the same.

The object of this invention is to provide means for avoiding the clouds of dust and dirt which envelop the rear end of automobiles when moving at high speed.

A further object is to provide improved means for securing a proper exhaust from gas, steam, or similar engines used on automobiles and to dispose of the exhaust vapors.

A simple embodiment of all the features of the invention is shown in the accompanying drawings, in which—

Figure 1 is a diagrammatic plan of the running gear of an automobile embodying the invention in a preferred form. Fig. 2 is a vertical section on the line 2 of Fig. 1.

In the drawings, A is the lower framework of the automobile, B the front and C the rear wheels, D a motor engine of any suitable form which is shown as driving the automobile through motor shaft 10, bevel gears 11, cross shaft 12 and sprocket chain 13. It will be understood that these parts may be of any other or suitable construction, my invention being applicable to automobiles of various forms and employing any suitable motor mechanism.

Referring now to the novel features of the construction shown, E is a flat tube or box extending substantially the full width of the frame A and from front to rear of the automobile. This tube E tapers from its open inlet or mouth 14 at the front end of the automobile where the vertical dimensions of the tube are considerable, to much smaller vertical dimensions at its discharge or rear mouth 15 so that the air received at the inlet 14 is compressed as it passes through the tapering tube to the discharge 15 where it is discharged with great force.

The rear portion of the tube E is preferably expanded sidewise as shown at 16 and provided with baffle plates 26 with the result that a portion of the air is thrown out sidewise as it leaves the discharge 15, and thus acts upon the rims of the rear wheel C so as to blow off the dust and dirt and prevent the same being carried upward as the wheels rotate. The air from the central portion of the discharge 15 also blows rearward the dust which tends to rise behind the automobile and thus keeps the rear of the automobile free therefrom.

If the running gear be such that the tube E can be accommodated otherwise, the tube may extend full width from the front to the rear end of the automobile, but, in the construction shown, and as will be found preferable in most cases, the tube E is cut away or divided through a portion of its length so as to accommodate the motor mechanism, thus forming through a portion of the length of the automobile two tubes on opposite sides of the motor. Any other suitable construction of the tube to accommodate the motor mechanism may be used. This tube E also forms an efficient means for securing a proper exhaust when motor engines are used and disposing of the exhaust vapors, it being necessary only to conduct the exhaust from the motor into the tube E, the draft in which will then produce a forced exhaust and carry off the exhaust vapors at the rear of the automobile. In the construction shown, the motor D has the exhaust muffler F from which two pipes 17 conduct the exhaust to the two parts of the tube E on opposite sides of the motor mechanism.

It may be found desirable in some cases to provide a fan for creating a stronger current of air through the tube E, and for this purpose I have shown the tube cut away or provided with openings 18 at opposite sides of the motor mechanism and a fan G as mounted upon the driving shaft 10 just ahead of these openings, plates 19 on opposite sides being used behind the fan to form conduits leading from the fan to the parts of the tube E on opposite sides of the motor mechanism.

It will be understood that the invention may be embodied in various forms and that I am not to be limited to the details of the construction shown, although this forms a convenient embodiment of the invention.

What I claim is:—

1. A motor vehicle having a tube extending longitudinally of and below the vehicle body and open at its front and rear ends and having its discharge of substantially the width of the vehicle body and positioned to blow away the dust and dirt rising behind the vehicle.

2. A motor vehicle having a flat tube of substantially the width of the vehicle body extending longitudinally of the vehicle and open at its front and rear ends and having its discharge contracted vertically and positioned to blow away the dust and dirt rising behind the vehicle.

3. A motor vehicle having a driving mechanism central of the vehicle and tubes extending longitudinally of the vehicle on opposite sides of the motor mechanism and open at their front and rear ends, the discharge of said tubes being of substantially the width of the vehicle body and positioned to blow away the dust and dirt rising behind the vehicle.

4. A motor vehicle having a flat tube of substantially the width of the vehicle body extending longitudinally of the vehicle and open at its front and rear ends and having its discharge contracted vertically and positioned to blow away the dust and dirt rising behind the vehicle, said tube being formed in two parts for a portion of its length intermediate of the ends, and motor mechanism mounted between the two parts of the tube.

5. A motor vehicle having a tube extending longitudinally of the vehicle and open at its front and rear ends and having its discharge positioned to blow away the dust and dirt rising behind the vehicle, in combination with a motor engine for the vehicle, and connections for conducting the exhaust from the engine to the tube.

6. A motor vehicle having a tube extending longitudinally of the vehicle and open at its front and rear ends and having its discharge positioned to blow away the dust and dirt rising behind the vehicle, in combination with a motor engine for the vehicle, connections for conducting the exhaust from the engine to the tube, and a fan for increasing the draft in said tube.

7. A motor vehicle having a tube extending longitudinally of the vehicle and open at its front and rear ends and having its discharge of substantially the width of the vehicle body and positioned to blow away the dust and dirt rising behind the vehicle, and a fan for increasing the draft in said tube.

8. A motor vehicle having a driving mechanism central of the vehicle including a motor engine, tubes extending longitudinally of the vehicle on opposite sides of the motor mechanism and open at their front and rear ends, the discharge of said tubes being positioned to blow away the dust and dirt rising behind the vehicle, and connections for conducting the exhaust from the engine to the tubes on opposite sides of the motor mechanism.

9. A motor vehicle having a driving mechanism central of the vehicle including a motor engine, tubes extending longitudinally of the vehicle on opposite sides of the motor mechanism and open at their front and rear ends, the discharge of said tubes being positioned to blow away the dust and dirt rising behind the vehicle, connections for conducting the exhaust from the engine to the tubes on opposite sides of the motor mechanism, and a fan for increasing the draft in said tubes.

10. A motor vehicle having a flat tube of substantially the width of the vehicle body extending longitudinally of the vehicle and open at its front and rear ends and having its discharge of substantially the width of the vehicle body and contracted vertically and positioned to blow away the dust and dirt rising behind the vehicle, and the discharge being constructed to discharge air sidewise against the rims of the rear wheels during their upward movement.

11. The combination with the vehicle body A, of the tube E of substantially the width of the vehicle body and tapering in vertical dimensions from the enlarged front inlet 14 to the contracted rear discharge 15.

12. The combination with the vehicle body A, of the tube E tapering from the enlarged front inlet 14 to the contracted rear discharge 15 and having at the discharge end the side delivery formed by the inclined side walls 16 and baffle plates 26.

In testimony whereof, I have hereunto set my hand, in the presence of two subscribing witnesses.

PETER N. RAMSEY.

Witnesses:
C. J. SAWYER,
J. H. GRAVES.